United States Patent [19]
Lane

[11] Patent Number: 6,031,960
[45] Date of Patent: *Feb. 29, 2000

[54] METHODS FOR MODIFYING A VIDEO DATA STREAM BY ADDING HEADERS TO FACILITATE THE IDENTIFICATION OF PACKETS INCLUDING A PCR, PTS OR DTS VALUE

[75] Inventor: Frank Lane, Medford Lakes, N.J.

[73] Assignee: Hitachi America, Ltd., Tarrytown, N.Y.

[ * ] Notice: This patent is subject to a terminal disclaimer.

[21] Appl. No.: 09/131,759

[22] Filed: Aug. 10, 1998

Related U.S. Application Data

[62] Division of application No. 08/481,022, Jun. 7, 1995, Pat. No. 5,793,927.

[51] Int. Cl.[7] .............................. H04N 5/783; H04N 5/92
[52] U.S. Cl. ............................... 386/68; 386/81; 386/111; 348/423
[58] Field of Search ............................... 386/6–8, 33, 68, 386/69, 81, 82, 111, 112; 348/423; H04N 5/76, 5/92, 5/783, 7/12

[56] References Cited

U.S. PATENT DOCUMENTS

| | | | |
|---|---|---|---|
| 5,444,490 | 8/1995 | De With et al. | 348/423 |
| 5,467,342 | 11/1995 | Logston et al. | 370/17 |
| 5,521,927 | 5/1996 | Kim et al. | 348/423 |
| 5,535,008 | 7/1996 | Yamagishi et al. | 386/109 |
| 5,537,619 | 7/1996 | Higurashi et al. | 348/423 |
| 5,565,923 | 10/1996 | Zdepski | 348/423 |
| 5,566,174 | 10/1996 | Sato et al. | 348/423 |
| 5,570,132 | 10/1996 | De With et al. | 348/423 |
| 5,598,352 | 1/1997 | Rosenau et al. . | |
| 5,602,595 | 2/1997 | Citta et al. | 348/423 |
| 5,621,840 | 4/1997 | Kawamura et al. | 386/111 |
| 5,701,386 | 12/1997 | Yoneyama | 386/68 |
| 5,729,648 | 3/1998 | Boyce et al. | 386/68 |
| 5,734,719 | 3/1998 | Tsevdos et al. | 348/385 |
| 5,740,307 | 4/1998 | Lane | 386/81 |

OTHER PUBLICATIONS

Intenational Standards Organization—Moving Picture Experts Group, Drafts of Recommendation H.262, ISO/IEC, 13818–1, Nov. 1993.
International Standards Organization—Moving Picture Experts Group, Drafts of Recommendation H.262, ISO/IEC 13818–2, Nov. 1993.

*Primary Examiner*—Thai Tran
*Attorney, Agent, or Firm*—Straub & Pokotylo; Michael P. Straub

[57] ABSTRACT

Methods and apparatus for insuring that a trick play data stream, e.g., a stream of data used for fast forward or reverse playback operation, complies with preselected data standards and in particular the MPEG-2 standard are disclosed. Various methods are described for generating PCR, PTS and DTS values for a trick play data stream, which is generated from a normal play data steam, and is intended for recording in trick play segments of a tape. The described methods include generating new PCR, PTS and DTS values as a function of the trick play speed at which the data is intended to be read back. Methods and apparatus for correcting PCR, PTS and DTS values read from a tape during trick playback operation are also disclosed. The disclosed methods are directed to generating new PCRs, PTSs and DTSs to provide am MPEG-2 compliant bitstream. The described methods and apparatus are applicable to a plurality of storage and playback devices capable of implementing trick play including compact disks.

12 Claims, 2 Drawing Sheets

METHODS FOR MODIFYING A VIDEO DATA STREAM BY ADDING HEADERS TO FACILITATE THE IDENTIFICATION OF PACKETS INCLUDING A PCR, PTS OR DTS VALUE

This application is a division of patent application Ser. No. 08/481,022 filed Jun. 7, 1995 and entitled "Methods for Monitoring and Modifying a Trick Play Data Stream to Insure MPEG Compliance" now U.S. Pat. No. 5,793,927.

FIELD OF THE INVENTION

The present invention is directed to video recording and playback devices and, more particularly, to methods for insuring that a trick play data stream, e.g., a stream of data used for fast forward or reverse playback operation, complies with preselected data standards.

BACKGROUND OF THE INVENTION

The use of digital, as opposed to analog signals, for television broadcasts and the transmission of other types of video and audio signals has been proposed as a way of allowing improved picture quality and more efficient use of spectral bandwidth over that currently possible using analog NTSC television signals.

The International Standards Organization has set a standard for video data compression for generating a compressed digital data stream that is expected to be used for digital television and with digital video tape recorders (VTR's). This standard is referred to as the ISO MPEG (International Standards Organization—Moving Picture Experts Group) ("MPEG") standard. One version of the MPEG standard, MPEG-2, is described in the International Standards Organization—Moving Picture Experts Group, Recommendation H.222.0, ISO/IEC 13818-1"Information Technology—Generic Coding Of Moving Pictures and Associated Audio" dated Nov. 13, 1994, ("the ISO 13818-1 International Standard") hereby expressly incorporated by reference.

The MPEG-2 Systems layer, which is the syntax and semantics for the transport packetization and multiplexing of an MPEG-2 bitstream, also referred to as a data stream, is described in detail in the ISO 13818-1 International Standard. The MPEG-2 systems layer carries within it a program clock reference (PCR) of the system clock for each program in a multiplex of programs being transmitted. The PCRs are used, e.g., at decoding time, e.g., by a phase locked loop circuit to synchronize a decoder system clock to the system clock of an encoder originally used to generate the bitstream being decoded. The MPEG-2 systems layer also includes a presentation time stamp (PTS) and may include a decoding time stamp (DTS). The PTS and DTS values are samples of the PCR value divided by 300. The PTS and DTS values indicate the tine at which a particular frame represented by data in the bitstream is to be displayed or decoded, respectively. The PCR, PTS and DTS values included in a bitstream allow a decoder to correctly decode the bitstream thereafter display the video and/or audio of, e.g., a television program represented by the bitstream.

As part of the MPEG-2 standard, constraints are placed on the timing information which must be included in an MPEG-2 bitstream. In particular, MPEG-2 requires that the duration between two subsequent encodings of PCR signals must not exceed 100 msec in time, where the time is measured in terms of the time required to transfer the data, and the duration between two subsequent encodings of the PTSs must not exceed 700 msec., where the time is measured in terms of display time.

Thus, the MPEG standard provides various constraints, e.g, signal timing requirements, that are intended to insure that a bitstream can be decoded and displayed properly.

It is expected that digital VTR's which record MPEG encoded video bitstreams will have special areas on a tape in which trick play data, i.e., data intended to be displayed during one or more modes of VTR trick play operation such as fast forward and reverse, is recorded. The trick play data may be video data extracted at recording time from a received bitstream, e.g., from data intended to be displayed during periods of normal VTR playback operation. During trick playback operation trick play data will be read from a tape by the VTR and output to a decoder for trick playback decoding.

For the trick play data recorded on the tape to be fully MPEG-2 compliant, e.g., for it to form a syntactically legal MPEG transport bitstream when read, it must be encoded prior to recording assuming a certain playback speed.

If a VTR uses trick play data recorded assuming a certain playback speed, e.g., assuming 4× fast forward playback operation, for display during an additional mode of trick playback operation, e.g., at 2× fast forward, the recorded PCR, PTS and DTS values will not be correct for the additional mode of VTR operation.

In such a situation, i.e., where data was recorded assuming one playback speed, and the data is read back at another playback speed, there is a need to correct the PCR, PTS and DTS values read from the tape to produce an MPEG-2 compliant bitstream which can be decoded and displayed, e.g., by am MPEG compatible decoder and display device such as a television set attached to a VTR.

Accordingly, there is a need for methods of recording data in a manner that facilitates its subsequent reading and decoding into an MPEG compliant bitstream, and for correcting the timing information contained in a bitstream, e.g., a trick play data bitstream, so that it conforms to MPEG standards during, e.g., trick playback operation.

SUMMARY OF THE PRESENT INVENTION

The present invention is directed to video recording and playback devices and, more particularly, to methods for insuring that a trick play data stream, e.g., a stream of data used for fast forward or reverse playback operation, complies with preselected data standards and in particular the MPEG-2 standard.

In accordance with the present invention, various methods are described for generating PCR, PTS and DTS values for a trick play data stream generated from a normal play data steam. The described methods include generating new PCR, PTS and DTS values as a function of the trick play speed at which the data is intended to be read back.

Circuits and methods for correcting PCR, PTS and DTS values read from a tape during trick playback operation are also disclosed. The disclosed methods are directed to generating new PCRs, PTSs and DTSs to provide am MPEG-2 compliant bitstream.

The methods and apparatus of the present invention for recording trick play data, and processing trick play data that is read back at a speed or direction of video play back device operation other than the speed or direction for which it was encoded to be read back at are described in the context of a video tape recorder. However, they are also applicable to other storage medium which support trick play operation including, e.g., compact discs. Furthermore, it is to be understood that the general techniques disclosed for adjusting timing stamps, e.g., PCRs and PTS, and timing stamp spacing, in accordance with the present invention, may be used to insure compliance with digital recording standards other than MPEG-2.

DETAILED DESCRIPTION

The present invention is directed to methods and apparatus for insuring that a bitstream recorded on and read from a storage device, e.g., a tape, will comply with preselected data standards, e.g., the MPEG-2 data standard. The bitstream may be, e.g., a trick play bitstream comprising data representing frames to be displayed during fast forward or reverse modes of playback device operation.

Figure 1:
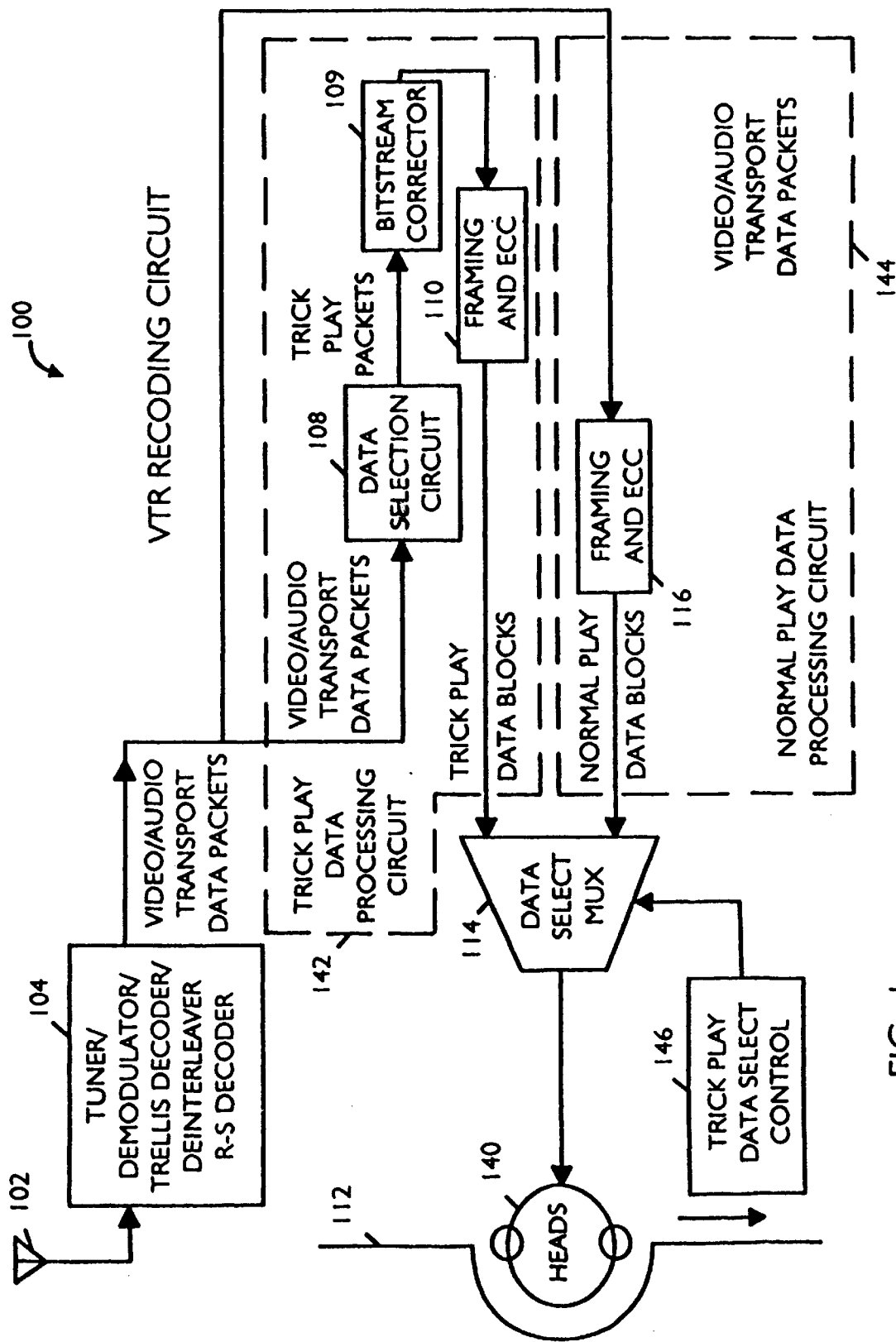
FIG. 1 illustrates a video recording device implemented in accordance with one exemplary embodiment of the present invention.

Referring now to FIG. 1, there is illustrated a video tape recording (VTR) circuit 100 implemented in accordance with one embodiment of the present invention. While the recording circuit 100 of the present invention is shown, for purposes of illustration, as a VTR recording circuit, it is to be understood that the recording and playback circuits of the present invention can be used with a host of recording mediums including, e.g., optical disks. The VTR recording circuit 100 comprises an antenna 102 for receiving a signal, e.g., a television signal, and a tuner/demodulator/trellis decoder/deinterleaver and R-S decoder circuit 104 for generating a digital bitstream from the received signal. The digital bitstream output by circuit 104 includes, e.g., video/audio transport data packets which are supplied to the input of a trick play data processing circuit 142 and a normal play data processing circuit 144.

The trick play data processing circuit 142 is responsible for selecting a subset of the received data for use during one or more VTR modes of trick play operation, e.g., fast forward and reverse modes of operation. The trick play data selection operation is performed using any one of a plurality of data selection techniques which can be implemented by the trick play data selection circuit 108. The trick play data selection circuit 108 outputs the transport data packets, refered to as trick play data packets, and supplies them to the input of a bitstream corrector circuit 109. As will be discussed below, the bitstream corrector circuit 109 operates in accordance with the present invention to modify existing PCR, PTS and/or DTS signals, or to generate new PCR, PTS and/or DTS values associated with the trick play data packets output by the trick play data selection circuit 108, in accordance with the present invention, to insure that the trick play data will produce an MPEG-2 compliant bitstream when read back from the tape during at least one mode of VTR trick play operation.

The trick play bitstream, with the corrected or newly generated PCR, PTS and/or DTS signals output by the bitstream corrector circuit 109 are supplied to a framing and ECC circuit 110 which is responsible for arranging the trick play transport data packets into, e.g., trick play data blocks and groups of trick data blocks for which ECC bits are generated. The trick play data blocks and ECC bits are output by the framing and ECC circuit 110 and supplied to the first input of a data select multiplexer (MUX) 114.

The normal play data processing circuit 144, like the trick play data processing circuit 142, receives video/audio transport data packets as its input. The received data packets are supplied to the input of a framing and ECC circuit 116 which arranges the received data packets into normal play data blocks and generates error correction (ECC) bits for each of the normal play data blocks. The normal play data blocks and ECC bits are output by the framing and ECC circuit 110 and supplied to a second input of the data select MUX 114.

It should be noted that the ECC bits for the normal and trick play data blocks can be incorporated therein.

The data select MUX 114 is controlled, by a trick play data select control circuit 146, to output either the trick play data blocks or the normal play data blocks, as a function of the position of a set of heads 140 over a tape 112. When a recording head is over a tape location which has been allocated for the storage of trick play data, the data select MUX is controlled to output trick play data blocks which are supplied to the set of heads 140. However, when a recording head is over a tape location allocated for the storage of normal play data, the trick play data select control circuit 146 controls the data select MUX 114 to output normal play data blocks which are supplied to the set of heads 140.

Figure 2:
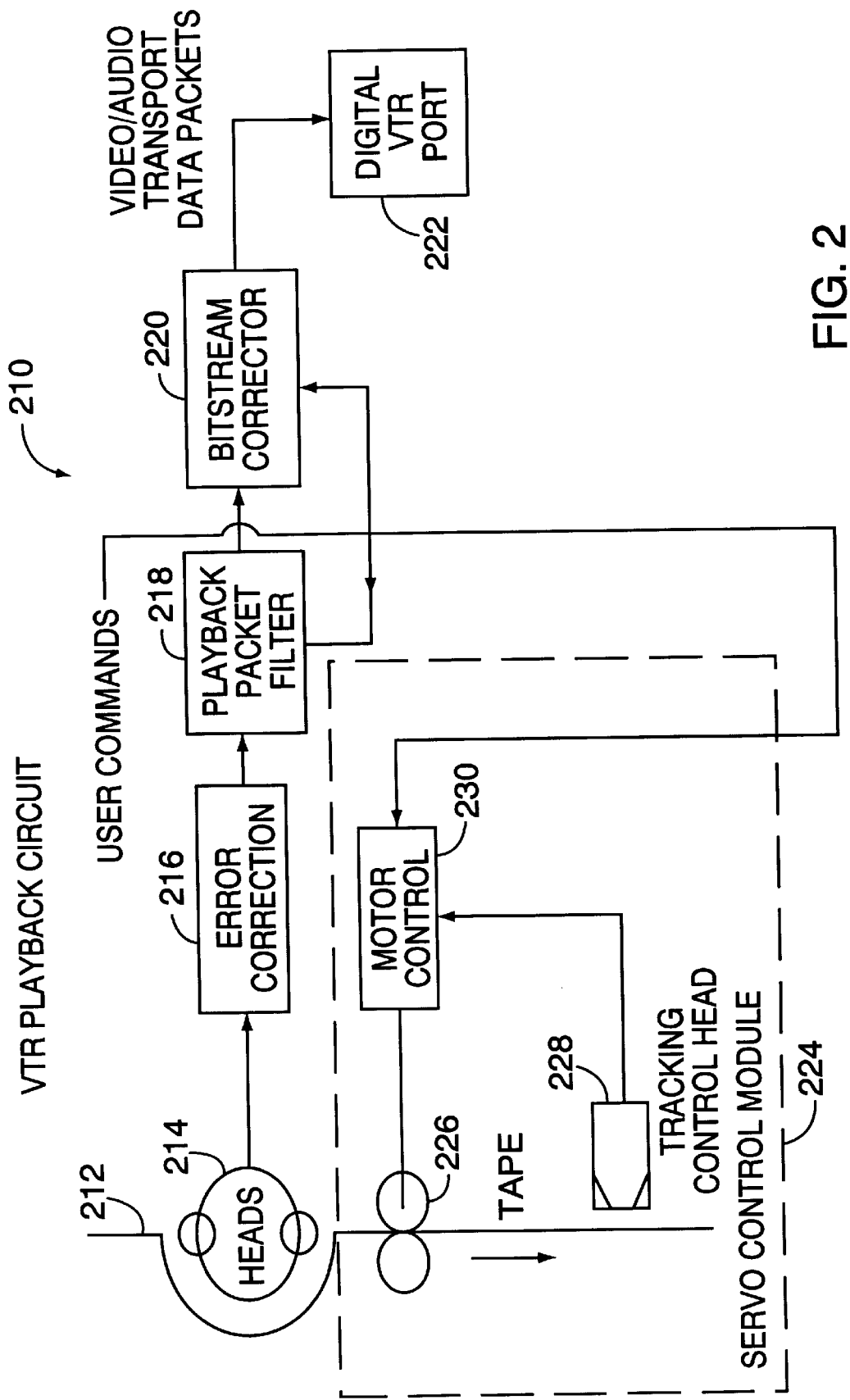
FIG. 2 illustrates a video playback circuit implemented in accordance with another exemplary embodiment of the present invention.

Referring now to FIG. 2, there is illustrated a VTR playback circuit 210 implemented in accordance with one exemplary embodiment of the present invention. As illustrated in FIG. 2, the VTR playback circuit 210 comprises a set of heads 214, an error correction circuit 216, a playback packet filter 218, a bitstream corrector circuit 220 a digital VTR port 222, and a servo control module 224. The position of a tape 212 relative to the set of heads 214 is controlled by the servo control module 224 during playback operation.

User commands indicating, e.g., the particular mode of VTR playback operation such as forward or reverse and the speed of operation are supplied to the playback packet filter 218, bitstream corrector circuit 220, and a motor control circuit 230 of the servo control module. The motor control circuit 230 adjusts the position of the tape 212 by controlling the movement of a set of capstans 226 as a function of the output of a tracking control head 228 and a received user command. User commands may be input by, e.g., manual operation of a switch on a VTR control panel.

Data is read from the tape during playback operation by the set of heads 214 and is supplied to the error correction circuit 216. The error correction circuit 216 uses the ECC bits read back from the tape with the normal and trick play data blocks to correct data errors. Corrected data read from the tape, e.g., normal play and trick play transport data packets, are supplied-by the error correction circuit 216 to the playback packet filter 218.

The playback packet filter 218 outputs a bitstream from which data packets read from the tape and not used during the selected mode of VTR operation are filtered. The bitstream output by the playback packet filter 218 is supplied to the bitstream corrector circuit 220 which operates in accordance with the present invention to modify PCR, PTS and/or DTS signals already existing in the bitstream, or to generate new PCR, PTS and/or DTS signals to insure that the bitstream output by the bitstream corrector 220 includes PCT, PTS, and/or DTS values that are in compliance with MPEG-2 for the specific mode of VTR operation as indicated by a user command supplied to the bitstream corrector circuit 220.

The bitstream output by the bitstream corrector circuit 220 is supplied to, e.g., a digital VTR port which may be coupled to, e.g., a decoder which may be part of a display device such as a television receiver.

To support trick playback operation modes such as fast forward/fast reverse, the trick play data selection circuit 108 of the VTR recording circuit 100 selects data from the bitstream received by the trick play data processing circuit 142, e.g., the normal play bitstream, which is then recorded by the set of heads 140 into locations on the tape 112, e.g., trick play tape segments, which are reserved for trick play data. In accordance with one embodiment of the present invention, the trick play data is recorded as a legal MPEG-2 transport data stream which corresponds to a preselected playback data rate, i.e., upon playback the recorded data will be read back as a legal MPEG-2 transport data stream corresponding to the preselected playback data rate.

This embodiment requires that PCR values, recorded with the trick play data, are encoded with the correct timebase and frequency for the preselected playback rate and that PTS and/or DTS values are encoded with the trick play data so that the frames read back from the tape will be presented at the correct rate relative to the PCR values.

In addition to the PCR and PTS/DTS constraints imposed by MPEG-2, the VTR recording circuit 100 may impose additional constraints on the trick play data recorded on the tape to facilitate VTR trick playback operation. Such additional constraints may include, e.g., a limitation requiring that trick play frames be limited to intra-coded (I-) frames which do not require data corresponding to additional frames to be decode.

In one embodiment, the trick play data selection circuit 108 selects data corresponding to I-frames to be used as trick play data thereby avoiding the use of inter-frame, e.g., P- and B-frame, data for trick play.

In such an embodiment, the trick play data selection circuit 108 selects data representing I-frames from the normal play data and generates a trick play data stream from the selected I-frames. The generation of the trick play data stream may include performing one or more data reduction operations on the selected I-frames. Thus, the I-frames included in the trick play data stream generated by the data selection circuit 108 may include reduced resolution I-frames which were generated by deleting high frequency discrete cosine transform (DCT) coefficients from blocks of video (data included in the normal play bitstream to decrease the size of the blocks selected to be included in the trick play data stream.

During trick play operation, because of the path traced over the tape by the set of heads 140, the recovered data rate is usually much lower than normal playback data rate.

Because the data rate recovered by the VTR playback circuit 210 during trick playback operation is usually very low compared to the original bit rate of the normal play bitstream, even reduced resolution I-frames will generally take longer than a frame period, which corresponds to the time used to display a frame during normal playback operation, to recover and send to, e.g., a decoder circuit, via e.g., the digital VTR port 222. Thus, during fast forward or fast reverse trick playback operation, each frame will probably have to be held and displayed for more than a frame period by, e.g., a display processor responsible for controlling the display of the video frame where a frame period corresponds to the time normally used to display a frame during normal playback operation.

As a result of the low recovered data rate during trick play, a decoder circuit coupled to, e.g., the VTR port 222, will generally not receive a sufficient amount of data to decode a full frame in a frame period. Accordingly, this creates a decoder buffer underflow condition.

As will be discussed further below, the bitstream corrector circuit 220 of the present invention, uses one or more of a plurality of different methods of addressing the potential decoder buffer underflow problem. Generally, these methods include the adjusting or generation of PTS and, optionally, DTS values to insure that a decoder receiving data in an underflow situation will not attempt to decode the data until all the frame data is received. The bitstream corrector circuit 220 of tie VTR playback circuit 210 accomplishes this by generating a PTS or DTS value that prevents the decoder from decoding the contents of a frame buffer in the case of a buffer underflow until sufficient data is received to permit a frame to be properly decoded.

In such an embodiment, where the bitstream corrector 220 generates PTS or DTS values during buffer underflow conditions, each frame, e.g., trick play frame, is independently packetized in at least one elementary stream (PES) packet. While a frame can be divided into multiple PES packets, in accordance with the present invention, the use of multiple PES packets per frame may result in a penalty in terms of increased overhead resulting in decreased data transmission efficiency.

To prevent decoder buffer underflow, the bitstream corrector circuit 220, in another embodiment, stores the trick play frame data until it has the data corresponding to a full frame. The bitstream corrector circuit 220 then outputs this data to the decoder multiple times, e.g., whenever the decoder is due to receive a new frame, until the data for a new complete frame has been stored and is ready to be supplied to the decoder.

The trick play data read from the tape may be a single set of data which is intended to be used for both fast forward and fast reverse playback modes of operation. The same trick play data may be recorded multiple times on the tape in different tape locations in an attempt to increase the chances for data recovery. In the case where a single set of trick play data is used for both forward and reverse trick playback operation, it is likely that a concatenation of I-frames or I-frames and transparent P-frames are the only normal play data subsets that will decode properly for the various fast modes of trick playback operation because of the uncertainty of the order (forward or reverse) in which the data corresponding to the frames will be read from the tape.

When separate sets of trick play forward and reverse data are recorded on a tape, the use of inter-frame coded data during trick play is possible since the order in which the frames for a specific mode of trick play operation will be read from the tape becomes predictable. In such a case, it is possible to construct a trick play data stream in which the holding time for each frame is one frame period. If sufficient data is read from the tape to avoid decoder buffer underflow, MPEG-2 does not require a PTS and/or DTS to be encoded for each frame, or that each frame be in an individual PES packet.

However, to facilitate support of multiple speed trick playback operation using a single trick play data set for a plurality of different speeds and/or directions of trick play operation, it is desirable that a PTS and/or DTS be included for each frame and that the data corresponding to each frame be included in an individual PES packet.

In one embodiment, the bitstream corrector 109 of the VTR recording circuit 100 of the present invention is responsible for insuring that the trick play data stream recorded on a tape circuit 210 includes each frame in a single PES packet with a PTS and/or DTS.

When a VTR playback circuit operates in fast forward or fast reverse it will recover data, e.g., trick play data, from the trick play segments of a tape and send it to a decoder. The amount of data recovered, however, is a function of the playback rate which, in the case of fast forward/reverse operation, is faster than the normal playback speed. Thus, if the trick play data recorded and read back from the tape was encoded before recording for playback at a fast speed of, e.g, 8× normal and is played out at, e.g., 18× normal, the data rate of the trick play data stream output by the playback packet filter 218 will be different than that for which the data was originally encoded. Accordingly, the PCR, PTS and/or DTS values read from the tape will not be correct when the playback rate is different than the playback rate for which the data was originally encoded.

Slow speed playback operation offers similar data rate and timing problems to those associated with faster than normal playback speeds. However, during slower than normal playback speeds it is possible to read and output the normal play data recorded on the tape. Thus, during slow speed playback operation a VTR will probably use the entire recorded normal play bitstream as its source rather than an extracted subset. However, the VTR playback circuit will probably deliver it to a decoder at a rate less than that for which it was encoded. Accordingly, PCR and PTS/DTS values read from the tape will be incorrect in the slow playback case since the displayed frames will have a holding and display time greater than 1 frame. To ease slow motion playback decoding requirements, the normal play data should be encoded such that the data corresponding to each normal play frame is contained in an independent PES packet with an encoded PTS and, optionally, a DTS. This is a constraint that is required by the Grand Alliance™ ADTV specification for ADTV bitstreams.

The operation of the bitstream corrector circuit 109 of the VTR recording circuit 100 of the present invention and the bitstream corrector circuit 220 of the VTR playback circuit 210 will now be discussed in detail beginning with a discussion of the recording of trick play data for fast forward playback operation.

After extraction or selection of trick play data from the normal play bitstream by the data selection circuit 108, the trick play-data should be put back into an MPEG-2 compliant transport stream. This operation is performed, in the VTR recording circuit 100, by the bitstream corrector circuit 109. As discussed below, PCR values are generated and inserted into the adaptation headers of trick play transport packets output by the data selection circuit 108. This operation is performed by the bitstream corrector circuit 109, as required to produce an MPEG-2 compliant bitstream of trick play data. Because the trick play data received by the bitstream corrector circuit 109 was not encoded at the rate at which it will be decoded, e.g., it was encoded for normal play operation and will be decoded during fast forward playback operation, new PCR values have to be generated and included in the trick play data stream to achieve MPEG-2 compliance.

The long term average data rate for a specific preselected trick playback mode of operation, e.g., 18× fast forward, can be predicted with reasonable certainty from the recording pattern of the trick play data on the tape and the expected fast forward playback rate.

Furthermore, PCRs can be included in a MPEG-2 bitstream at preselected intervals of up to 100 ms apart, e.g., in terms of the time required to transfer the data between the PCRs. The PCR is a value normally generated in response to the incrementing of a 33 bit register as a function of a 27 MHz clock signal and a 9 bit extension. The 33 bit PCR base can have a value of anywhere from 0 to 8,589,934,591 while the 9 bit PCR extension can have a value from 0 to 299. The 9 bit extension is incremented on every cycle of a 27 MHz system clock and is reset after reaching the value 299. The 33 bit base is incremented whenever the 9 bit extension wraps around to zero with the 33 bit base wrapping around to zero after reaching its maximum value of 8,589,934,591.

The PCR base and PCR extension can be combined into a signal PCR value for purposes of arithmetic on PCRs. This is accomplished by multiplying the PCR base by 300 and adding the PCR extension value.

$$PCR\ value = PCR\ base * 300 + PCR\ extension$$

Then, in accordance with the present invention, normal arithmetic can be accomplished on the PCR value with the restriction that the PCR value will wrap around at a value of 8,539,934,591*300+299. That is if the PCR value where incremented from 8,589,934,591*300+299 the next value would be 0. The PCR value can be converted back into a PCR base and extension for encoding in the bitstream. The PCR base is calculated by dividing the PCR value by 300 and dropping any fractional part to result in an integer, and the PCR extension is the remainder of the PCR value divided by 300.

$$PCR\ base = PCR\ value/300\ (integer)$$

$$PCR\ extension = remainder\ of\ PCR\ value/300$$

$$= PCR\ value - PCR\ base * 300$$

Generally, it is the sequence of PCR values and the incrementing thereof that is important and not the initial PCR value or starting point in a bitstream.

Since the predicted playback data rate for a preselected trick playback mode of operation is known, the period in terms of the time required to recover a specific amount of trick play data from the tape in the preselected mode of trick play operation is also known. Therefore the time, in the preselected playback mode, between data packets of trick play data may be calculated as (the amount of data between the data packets/the transfer data rate for the preselected-mode of trick play operation). By generating a PCR clock reference signal and including it in the trick play data bitstream so that the decoder receives a PCR at least once every 100 ms of playback time, MPEG-2 compliance is achieved.

In accordance with the present invention the PCRs to be included with the trick play data being recorded on the tape are generated based on the assumption that the trick play transport stream is a continuous stream of packets at the average predicted trick playback data rate.

In one embodiment, the bitstream corrector 109 generates a PCR for every preselected number of ms required to transfer data to a decoder during the specific mode of operation where the preselected number is less than or equal to 100, e.g., 50 ms. In such an embodiment, the amount of data output by the data selection circuit 108 is monitored and when the data output for the preselected trick playback mode of operation is an amount that approximately equals the amount that will be transferred to a decoder in the preselected number of ms, a PCR is generated by the bitstream corrector circuit 109 and inserted into the bitstream. Because the point at which a PCR is to be inserted into the data stream may not precisely match the location at which PCRs should be inserted into a data packet, the PCR may not be generated and inserted exactly at the preselected point but relatively close thereto.

In such an embodiment, each new PCR value generated by the bitstream corrector circuit 109 is equal to the previous PCR value plus an incremental value.

The PCR's represent a sample of a 33 bit counter plus a 9 bit extension. The PCR value increments at a 27 MHz rate. So, during-trick playback the PCR must appear to increment at a 27 MHz rate. Thus, if the data transfer rate for trick play output is known the PCR values can be calculated. For example, the time span between $PCR_1$ and $PCR_2$ is the amount of data in the bitstream between $PCR_1$ and $PCR_2$ divided by the rate at which it is sent to a decoder. The number of PCR increments is this time span times 27 Mega-increments/sec. Thus, the value of PCR2 can be calculated from the value of PCR1 plus the 27,000,000 times the number of bytes generated since $PCR_1$ divided by the transfer rate in bytes/second.

$$PCR_2 = PCR_1 + (\text{bytes since } PCR_1/\text{Transfer rate}) \times 27000000$$

In MPEG-2 the PCRs are constrained such that the time span between two PCRs must be less than 100 msec. So an alternate way of generating correct PCRs is to pick a span, T, less than 100 msec and compute the number of bytes that will be transfered during that span, B=T*transfer rate(bytes/sec.). Once B bytes have been generated a new PCR will be output at the first opportunity. Since a PCR is encoded in a packet header, it may not fall at exactly B bytes from the last PCR. So the number of bytes since B, until the PCR can be encoded must be counted. The new PCR value is then the old PCR value plus P=T*27000000 plus the number of bytes in excess of B divided by the transfer rate times 27000000 increments/sec.

$$PCR_2 = PCR_1 + P + (\text{bytes in excess of } B/\text{Transfer rate}) \times 27000000$$

As discussed above, the bitstream corrector 109 is responsible, in one embodiment, for packing the data representing each trick play frame into a PES packet. Each PES packet includes a PTS, and, optionally, a DTS in the PES header. Generally, it is expected that in most applications B-frames will not be included in a trick play data stream. In such cases, where the trick play data stream includes only intra-coded data DTS values do not need to be included in the PES header.

The time difference between subsequent PTSs, in the trick play data stream being recorded on the tape, should be the desired holding time for the previous frame ($\text{frame}_{i-1}$) times the desired output rate, e.g., period for displaying each frame. Thus, the generation of a PTS value by the bitstream corrector circuit 109 for a current frame, i.e. $\text{frame}_i$, can be represented by the following equation:

$$PTS_i = PTS_{i-1} + (\text{holding time frame}_{i-1}) \times 90 \text{ kHz}$$

where

PTS$_i$ represents the PTS value being generated for the data representing the current frame, $\text{frame}_i$;

PTS$_{i-1}$ represents the PTS value generated for the data representing the frame preceding the current frame, i.e., $\text{frame}_{i-1}$;

holding time $\text{frame}_{i-1}$ represents the time, as a multiple of a standard frame time, for which $\text{frame}_{i-1}$ is to be displayed; and where 90 kHz represents the clock rate for presentation time stamps during the normal mode of VTR playback operation.

To prevent picture tearing and possible loss of synchronization in the decoder the holding time during trick playback operation should preferably be an integer multiple of the normal playback operation frame period. For example, the holding time for $\text{frame}_{i-1}$ should be ($N_{i-1} \times$ frame period), where $N_{i-1}$ is an integer representing the number of frame times for which $\text{frame}_{i-1}$ is to be held.

Substituting ($N_{i-1} \times$ frame period) in the above equation for the holding time of $\text{frame}_{i-1}$ yields:

$$PTS_i = PTS_{i-1} + (N_{i-1} \times \text{frame period}) \times 90 \text{ kHz}.$$

If the desired average holding time for the trick play frames during the preselected mode of trick playback operation is not an integer multiple of the frame period, then the holding times of trick play frames can be dithered to achieve the desired average hold time per trick play frame. For example, if the desired average hold time is 4.25 frame periods, a sequence of four frames can be encoded by the bitstream corrector circuit 109 with 3 frames being assigned a holding time of 4 frame periods and 1 frame time being assigned a holding time of 5 frame periods. In such a case, the average holding time over any multiple of 4 trick play frames is (17 frame periods/4 frames)=4.25 frame periods.

In the above described manner, the bitstream corrector circuit 109 of the VTR recording circuit of the present invention generates PCR and PTS values for each frame of trick play data in the trick play datastream so that an MPEG-2 compliant bitstream will exist when the data is later read back from a tape during trick play operation at the preselected fast forward speed of trick play operation for which the trick play data was recorded.

Operation of the bitstream corrector circuit 220 of the VTR playback circuit 210 will now be discussed. When trick play data is read back and played at the speed for which it was encoded, the clock reference (PCR) and time stamps (DTS, PTS) should be correct for decoding. In such a case, the VTR needs to simply send the trick play data read back from the tape to a decoder without modification by the bitstream corrector circuit 220. However, if the trick play speed is other than that for which the data was encoded, then the clock reference values and time stamps will be wrong.

For example, consider a bitstream recorded for 18× normal speed trick playback operation. Since the data on the tape for trick play is fixed at recording time, the output data rate is a function fo the trick play speed. If the data is, e.g., 25 sync blocks per rotation of the set of heads and the data is repeated e.g., 18 times to facilitate 18× phase lock trick play, then the data rate during 18× speed playback operation ($DR_{18}$) will be:

$$DR_{18} = 25 \text{ blocks/}rot \times (376 \text{ bytes/5 blocks}) \times 150 \text{ }rps \times 18 \text{ speed/18 repetition}$$

=282 Kbytes/sec.

assuming a rotational rate of 150 revolutions/sec.;

376 bytes of data for every 5 blocks read from the tape; and that during 18 speed playback operation no duplicate data is read from the tape since the ratio of the playback speed to the repetition rate is 1.

at 8.5× trick playback operation the data rate would be as follows:

$$DR_{8.5} = 25 \text{ blocks/}rot \times (376 \text{ bytes/5 blocks}) \times 150 \text{ }rps \times 8.5 \text{ speed/18 repetition}$$

=133.1667 Kbytes/sec.

Since the effective playback data rate is lower in the 8.5× case, e.g., because duplicate trick play data is read, it takes longer to read back and transfer to a decoder a fixed amount of non-duplicative trick play data. This results in the time difference between two PCRs which are read back from the tape being lengthened by the ratio of the speed for which the data was encoded over the actual playback speed. To correct PCRs that are read back at a data rate that is lower than the rate they were intended to be read back at, the PCRs can be scaled by the ratio of the encoded data rate over the actual data rate as follows:

corrected $PCR_i = PCR_i \times$[encoded trick play speed/actual trick play speed]

Continuing the above example, in the case of data that was encoded to be read back at 18× speed and is actually read back at 8.5× speed the corrected PCRs are calculated as follows:

corrected $PCR_i = PCR_i \times 18/8.5$

As an alternative to calculating corrected PCR values from those read from the tape, new PCRs could be generated using a 27 MHz system clock to drive a 33 bit counter and a 9 bit extension. In such an embodiment, the bitstream corrector circuit 220 replaces the PCRs in the trick play data stream read from the tape with values obtained by sampling the 33 bit counter and a 9 bit extension, e.g, at preselected intervals which are up to 100 ms apart.

The difference in the actual data rate at which the data is read from the tape and the data rate for which the data was encoded to be read at has the same effect on the holding times and PTS, DTS values as it has on the PCR values. For example, if a frame had a holding time of N at 18× playback, then it will take a holding time of (N×18/8.5) to play that frame at 8.5× speed. Thus, the PTSs and DTs should also be adjusted to account for the effect of the different playback speed. A corrected PTS may be calculated as follows:

corrected $PTS_i = PTS_i$[encoded trick play speed/actual trick play speed]

For example where the data is encoded and recorded to be played back at 18× speed and is actually played back at 8.5× speed corrected PTS values would be calculated as follows:

$PTS_{i\_cor} = PTS_i \times 18/8.5$

After such a scaling or correction operation, it is desirable to again adjust the corrected PTS values so that they are integer multiples of the frame period. This can be done by lengthening or shortening each PTS as necessary to make it a multiple of the frame period, i.e., normal play frame display time, and tracking the remainder of the hold time so, it does not accumulate. The following algorithm may be uses by the bitstream corrector circuit 220 to accomplish this operation:

```
Begin
  remainder = 0
  Begin repeat
    PTS_cor = PTS_read × [encoded trick play
      speed/actual trick play
      speed]
    PTS_adj = int portion [PTS_cor/frame period] ×
                frame period
    remainder = remainder + PTS_cor − PTS_adj
    if (remainder > frame period) then
      PTS_adj = PTS_adj + frame period
```

-continued
```
      remainder = remainder − frame period
  repeat for next PTS
```

When trick playback operation is performed at a speed that is less than the speed the trick play data was encoded to be read back at, the spacing between PTRs and PTSs must not only be corrected, e.g., in the above described manner, but the spacing between such timing signals must also be checked.

If the PCRs where spaced at 100 msec intervals at the time they were encoded to be recorded on the tape, then lengthening that duration, e.g., by reading the data back at a lower trick play speed, would result in a bitstream that violates the MPEG-2 standard. This might present problems relating to a decoder's ability to use a phase lock loop circuit to decode the data. To insure that the MPEG-2 maximum interval constraint is not violated by a trick play data stream, the bitstream corrector circuit 220 can, and in one embodiment does, insert new PCR packets into the trick play datastream to satisfy the PCR spacing requirements.

In this context, the term PCR packet is used to refer to an MPEG-2 transport packet including a PCR value encoded in the adaptation header of the transport packet.

The new PCR packets which are inserted into the bitstream to insure MPEG-2 compliance, can be constructed without payload data by stuffing the adaptation header of the generated PCR packet so that it fills the entire packet payload. Inserting extra PCR packets in the trick play data stream will increase the trick play data rate slightly. However, as long as the adjusted PCRs which were generated from the original PCRs are transferred at the same relative position in time as if the new PCR packets were not included, the adjusted PCRs will not have to be adjusted again as a result of the addition of the new PCR packets added to insure that MPEG-2 PCR spacing requirements are satisfied.

In most cases, the trick play data stream output by the VTR playback circuit 210 will be padded with NULL packets to bring it up to the data rate of a normal playback data stream. In such a case, the PCR packets added to satisfy MPEG spacing requirements can be substituted for the NULL packets that would otherwise be added to the trick play bitstream by, e.g., the bitstream corrector circuit 220.

In addition to the constraints between PCRs, MPEG has a similar spacing requirement for PTS values, which can be spaced at a maximum distance of 700 msec in the bitstream. However, since the presentation time clock of a decoder is locked to the 27 MHz system clock during decoding it is not clear whether violating this MPEG constraint will present any problem for decoders in terms of their ability to decode a received bitstream.

If the MPEG PTS spacing constraint is to be satisfied, and the holding time for a frame exceeds 700 msec, then a dummy PES packet can be inserted into the trick play data stream to achieve the required PTS spacing.

In accordance with one embodiment of the present invention, dummy packets that are inserted to maintain the desired PTS spacing are constructed as transparent P-frames with a PTS appropriate to satisfy MPEG PTS maximum spacing requirements. A transparent P-frame, in this case, is a frame constructed completely from predictions from the previous frame, with the motion vectors and prediction residuals being set to zero so that the resulting decoded interframe is exactly the same as the previous frame.

Inserting dummy PES packets will increase the data rate, but if PCR spacing is not disturbed then their will be no need to adjust the PCRs as a result of the insertion of dummy PES packets.

To simplify the generation of dummy PES packets, in one embodiment, a read only memory coupled to the bitstream corrector circuit 220 is provided and used to store data representing a dummy PES packet as a fixed number of transport packets. In such an embodiment, the bitstream corrector circuit 220 uses the dummy PES packet information stored in the ROM when it needs to add a dummy PES packet to the bitstream.

Pseudo code is used below to represent methods of the present invention used to correct or generate PCR, PTS and a DTS values for each of the correction scenarios in this application. For each application, the pseudo code is presented for two different embodiments. The pseudo code for the first embodiment assumes that PCR values read from the tape are corrected, e.g., adjusted, and used to generate an MPEG compliant trick play data stream. The pseudo code for the second embodiment, on the other hand, assumes that a PCR counter will be used by the bitstream corrector circuit to generate new PCR values which are then inserted into the trick play bitstream with the PCR values read from the tape. In the second embodiment, PCR values supplied to the input of the bitstream corrector circuit 220, if any, are discarded rather than corrected. If desired the first and second embodiments can be combined with the first embodiment being used when PCRs are present in a bitstream supplied to the bitstream corrector circuit 220 and the second embodiment being used when PCRs are absent from the bitstream supplied to the bitstream corrector circuit 220.

Pseudo code representing the bitstream correction operations performed by the bitstream corrector circuit 220 of the present invention in two different embodiments, to correct a bitstream read back from the tape during a fast forward mode of trick playback operation is set forth below.

---

Bitstream Correction for Fast Forward - Embodiment 1

```
if (FF output rate = encoded rate for bitstream) then
    play out the bitstream
else
    scaling_factor = encoded_TP_speed/actual_TP_speed
    remainder = 0
    for (each packet)
        if (packet contains PCR) then
            set PCR = scaling_factor*PCR
        else if (100 ms since last PCR) then
            then insert new packet with PCR
        end if
        if (packet contains PTS)
            new PTS = scaling_factor*PTS
            adjustedPTS = largest_integer_less_than (newPTS/
                    frame_period) *frame_period
            remainder = remainder + newPTS - adjustedPTS
            if (remainder > frame_period) then
                adjustedPTS = adjustedPTS + frame_period
                remainder = remainder - frame_period
            end if
            set PTS = adjusted PTS
        else if (700 ms since last PTS)
            send dummy frame with PTS
        end if
        output packet
    end for
end if
```

Bitstream Correction for Fast Forward - Embodiment 2

```
initialize PCR counter
insert new packet with PCR
initialize PTS estimate = PCR +
        estimated delay for first picture
for (each packet)
    if (100 ms since last PCR) then
```

-continued

```
        insert new packet with current PCR counter
    end if
    if (packet contains PTS)
        set PTS = current PTS estimate
    end if
    if (700 ms since last PTS)
        send dummy frame with PTS
    end if
    send packet.
    update PCR counter
    update PTS estimate
end for
``` where, in the above pseudo code:
newPTS—is the estimate of the corrected PTS which is calculated by scaling the PTS read fromm the tape;
adjustedPTS—is the corrected PTS value adjusted by dithering so it fall on a frame period;
initialize PCR counter—represents the operation of setting the PCR value to any legal MPEG-2 PCR value as a starting point;
initialize PTS estimate—represents the operation of initializing the PTS to the PCR base plus a time delay as a function of the estimated time to send the first frame;
delay for first frame—is a time delay in PTS increments which represents the estimated time to send the first frame to a decoder;
update PCR—represents the operation of incrementing the PCR base and extension as a function of a 27 MHz clock; and
update PTS—represents the operation of incrementing the PTS as a function of a 90 kHz clock and the frame period.

Operation of the bitstream corrector circuit 220 will now be described in the case of fast reverse operation.

For trick play data that is recorded on a tape assuming that it will be read back and used for fast forward play and which is used in both fast forward and fast reverse modes of trick playback operation, the counting direction of the PCR, PTS and DTS clocks must be reversed for reverse playback operation.

One or more reversal buffers, incorporated into the playback packet filter 218, are responsible for re-ordering, e.g., reversing the order of the frame data read from the tape during reverse trick play operation when the data recorded for forward operation is read back and used for reverse playback operation.

In the case of data that was recorded for forward playback operation, which is read back during reverse operation, the PCR will count down as data is read from the tape and it must be reversed to count up. This can be accomplished by replacing the PCRs read from the tape with new PCR values generated using, e.g., a 33 bit counter value and a 9 bit extension both of which are generated as a function of a 27 MHz clock. Alternatively, new PCR values can be generated as a function of the original PCRs read from the tape using the knowledge that the original PCRs were calculated based on the amount of data recorded and the anticipated data rate during fast forward playback. Because the frame data may have to be reversed in reverse play there is not necessarily a simple relationship between PCRs recorded for forward playback operation and those read from the tape and sent to the decoder during reverse playback operation.

PTSs for reverse play will also have to be corrected when the data being used for reverse playback operation was recorded to be used during forward playback operation.

The PTSs for fast reverse play can, and in one embodiment of the present invention are, calculated by the bitstream corrector circuit 220 using the following equation:

$$PTS_{cor\_i} = PTS_{cor\_i-1} + (PTS_{old\_i-2} - PTS_{old\_i-1})$$

where:

$PTS_{cor\_i}$ is the corrected PTS value for the $i_{th}$ PTS value in the sequence of generated PTS values;

$PTS_{cor\_i-1}$ is the corrected PTS value for the PTS preceding the $i_{th}$ PTS value in the sequence of generated PTS values; and where $PTS_{old\_i-2}$ and $PTS_{old\_i-1}$ correspond to the (i-2) and (i-1) PTS values, respectively, in the sequence of i PTS values read from the tape.

Pseudo code setting forth two different embodiments of the present invention for correcting the PCR and PTS values during fast reverse playback operation which uses data recorded for fast forward operation, are set forth below. The first embodiment corrects PCR values read from the tape while the second embodiment generates PCR values independently from any values read from the tape.

---

Bitstream Correction for Fast Reverse - Embodiment 1

```
initialize PCR counter
scaling_factor = encoded_TP_speed/actual_TP_speed
remainder = 0
initialize revPTS = PCR + delay for first frame
for (each packet)
    if (packet contains PCR) then
        set PCR = last PCR + amount of data since last
                    PCR/data rate
    else if (100 ms since last PCR) then
        then insert new packet with PCR
    end if
    if (packet contains PTS)
        newPTs = scaling_factor*PTS
        adjustedPTS = largest_integer_less_than(newPTS/frame_
            period) *frame_period
        remainder = remainder + newPTs - adjustedPTS
        adjustedPTS = adjustedPTS + frame_period
        remainder = remainder - frame_period
        end if
        revPTS = last revPTS + oldPTS2 - oldPTS1
        oldPTS = oldPTS1
        oldPTS1 = adjustedPTS
        set PTS = revPTS
    else if (700 ms since last PTS)
        send dummy frame with PTS
    end if
    output packet
end for
```

Bitstream Correction for Fast Reverse - Embodiment 2

```
initialize PCR counter
insert new packet with PCR
initialize PTS estimate = PCR +
            estimated delay for first picture
for (each packet)
    if (100 ms since last PCR) then
        insert new packet with current PCR counter
    end if
    if (packet contains PTS)
        set PTS = current PTS estimate
    end if
    if (700 ms since last PTS)
        send dummy frame with PTS
    end if
    send packet
    update PCR counter
    update PTS estimate
end for
```

--- where, in the above pseudo code:

initialize revPTS—represents initialization of the value of the reverse PTS counter which is initialized using the initial PCR value for reverse processing and a delay corresponding to the estimated time required to send the first frame to a decoder.

oldPTS1—This variable represents the previous final corrected PTS value. It is initialized as the current PTS minus the estimated time to send a frame to a decoder.

old PTS2—This variable corresponds to the previous value of oldPTS1 and thus the value of the corrected PTS from two frames ago. This value is initialized as the initial value of oldPTS1 minus the estimated time to send a frame to a decoder.

last revPTS—This variable corresponds to the previous value of the reverse PTS. This variable is initialized in the same manner as the reverse PTS counter.

Last PCR—This variable corresponds to the previous value of the last corrected PCR that was generated.

Correction of the PCR, PTS and DTS values read from a tape during slow motion forward playback will now be described.

Slow motion is playing out the normal play data read from the tape, e.g., a normal play bitstream, with a holding time greater than 1 frame period. The effect on PCR and PTS values is similar to that of fast forward at a speed lower than the encoding speed, however, because a video tape recorder does not have full control over the process used to encode a normal play bitstream because it is normally received in an encoded form and recorded without re-encoding, correction of PCR, PTS and/or DTS values may be slightly more complex than in the fast forward case.

In the forward slow motion-case, the PCR and PTS/DTS values should be scaled by (1/slow motion playback speed) A simple scheme of the present invention used to maintain PTS alignment with the frame period is using a slow speed of 1/N times the normal playback speed where N is an integer. If the slow speed results in a holding time which is a non-integer number of a frame period, PTS dithering can be used as described above, to achieve the proper slow motion display rate.

In accordance with the present invention, during slow forward operation, if PCR spacing exceeds 100 msec the bitstream corrector circuit 220 inserts PCR packets to meet MPEG PCR maximum spacing requirements. If the PTS spacing exceeds 700 msec, the bitstream corrector circuit 220 inserts transparent P-frames if there are no B-frames in the sequence.

If B-frames are present in the sequence, inserting a transparent P-frame would result in a replication of the anchor frame rather than the previous B-frame thereby disrupting the frame sequence and the data stored in the anchor frame buffers.

Accordingly, if B-frames are present in the slow-motion bitstream, dummy B-frames are inserted into the bitstream by the bitstream corrector circuit 220, as required, to maintain proper PTS spacing. If the dummy frame being inserted is to be displayed following an anchor frame it can be completely predicted from the anchor frame. However, if the dummy frame follows a B-frame it is made to be a repetition of the B-frame data which it follows.

The spacing of frames with a holding time greater than 1 requires that a PES header with a PTS be used for each frame. If the source data, e.g., the data read from the tape during slow motion playback, wasn't encoded with a PES header and PTS per frame, than the VTR playback circuit 210 could simply output the data and rely on the underflow handling capability of a decoder receiving the data. However, to insure correct decoding, in one embodiment, the bitstream corrector circuit 220 inserts an extra PES header before each frame which doesn't have one and inserts a PTS into those frames which have a PES without a PTS. This can be done by repacketizing the entire bitstream, or by inserting extra transport packets which contain only the needed PES headers and adaptation header stuffing to fill the extra payload.

Pseudo code setting forth two different embodiments of the present invention for correcting the PCR and PTS values during slow forward playback operation are set forth below. The first embodiment uses PCR values read from the tape while the second embodiment generates completely new PCR values.

---

Bitstream Correction for Slow Forward - Embodiment 1

```
scaling_factor = 1/actual_speed
remainder = 0
for (each packet)
    if (packet contains PCR) then
        set PCR = scaling_factor*PCR
    else if (100 ms since last PCR) then
        then insert new packet with PCR
    end if
    if (packet contains PTS)
        newPTS = scaling_factor*PTS
        adjustedPTS = largest_integer_less_than
            (newPTS/frame_period) *frame_period
        remainder = remainder + newPTs - adjustedPTS
        if (remainder > frame_period) then
            adjustedPTS = adjustedPTS + frame_period
            remainder = remainder - frame_period
        end if
        setPTS = adjustedPTS
    else if (700 ms since last PTS)
        send dummy frame with PTS
    end if
    output packet
end for
```

Bitstream Correction for Slow Forward - Embodiment 2

```
initialize PCR counter
insert new packet with PCR
initialize PTS estimate = PCR +
    estimated delay for first picture
for (each packet)
    if (100 ms since last PCR) then
        insert new packet with current PCR counter
    end if
    if (packet contains PTS)
        set PTS = current PTS estimate
    end if
    if (700 ms since last PTS)
        send dummy frame with PTS
    end if
    send packet
    update PCR counter
    update PTS estimate
end for
```

---

Correction of the PCR, PTS and DTS values read from a tape during reverse normal or slow speed playback modes of operation will now be described.

Reverse playback of the normal play bitstream, whether at a normal or slower than normal speed, introduces various problems with regard to the correction of PCR, PTS and DTS values. If the bitstream includes inter-coded frames, e.g., B- or P-frames, these can only be correctly decoded if the decoding is done in the forward direction. Although a video playback circuit could buffer up a group of pictures (GOP) and pass it to a decoder, the decoder will, absent some control signal to the contrary, present the frames in the forward temporal order.

A somewhat better approach to addressing reverse playback operation at normal or slow speeds is to playback intra-coded frames in reverse order and delete the inter-coded frames from the trick play bitstream. In such an embodiment, the VTR playback circuit 210 buffers the I-frames read from the tape using, e.g., the reversal buffers incorporated into the playback packet filter 218, and then sends the I-frames to a decoder in a syntactically forward direction. This may result in jerky reverse motion because the inter-coded frames are deleted. However, this approach has the advantage of producing an MPEG compliant bitstream which San be decoded by a standard decoder. Inter-coded data, e.g., P- and B-frames can be used in reverse if the inter-coded frames or regions are transparent. Thus, if a progressive refresh scheme is used rather than I-frame refresh, reverse operation can be performed by having the bitstream corrector circuit 220 replace inter-coded macroblocks in the trick play bitstream with skipped or transparent macroblocks.

PCR values for reverse play can either be generated using a 27 MHz signal to drive a counter at playback time or by calculating the transfer rate and the amount of data sent to the decoder during normal or slow reverse operation. Unless the GOP structure is known, it is probably not possible to correctly encode PTS values because the holding time will be a function of the GOP size. Thus, in this case, the video playback circuit 210 will probably have to let the decoder buffer underflow in certain instances and rely on the correct response by the decoder to handle the underflow condition.

Pseudo code setting forth two different embodiments of the present invention for correcting the PCR and PTS values during normal or slow reverse playback operation are set forth below. The first embodiment uses PCR values read from the tape while the second embodiment generates completely new PCR values.

---

Bitstream Correction for Slow or Normal Reverse - Embodiment 1

```
initialize PCR counter
remainder = 0
initialize revPTS = PCR + delay for first frame
for (each packet)
    if (packet contains PCR) then
        set PCR = last PCR + amount of data since
            last PCR/data rate
    else if (100 ms since last PCR) then
        then insert new packet with PCR
    end if
    if (packet contains PTS)
        newPTS = PTS
        adjustedPTS =
            largest_integer_less_than(newPTS/frame_
            period) *frame_period
        remainder = remainder + newPTS - adjustedPTS
        if (remainder > frame_period) then
            adjustedPTS = adjusted PTS + frame_period
            remainder = remainder - frame_period
        end if
        revPTS = last revPTS + oldPTS2 - oldPTS1
        oldPTS2 = oldPTS1
        oldPTS1 = adjustedPTS
        set PTS = revPTS
    else if (700 ms since last PTS)
        send dummy frame with PTS
    end if
    output packet
end for
```

Bitstream Correction for Slow or Normal Reverse - Embodiment 2

```
initialize PCR counter
insert new packet with PCR
initialize PTS estimate = PCR +
        estimated delay for first picture
for (each packet)
    if (100 ms since last PCR) then
        insert new packet with current PCR counter
    end if
    if (packet contains PTS)
        set PTS = current PTS estimate
    end if
    if (700 ms since last PTS)
        send dummy frame with PTS
    end if
    send packet
    update PCR counter
    update PTS estimate
end for
```

Reverse playback operation, whether it be slow, normal or fast speed present several buffering problems when a bitstream that was recorded for forward playback operation is used as the data source for reverse playback operation since the frames are not read in the order in which they must be output to a decoder. For the data output during reverse operation to be in the correct syntactic order, the macroblocks represented by the data must be encoded from left to right and the slices from top to bottom. The data recorded for forward playback operation and read from the tape in reverse order will not have the correct ordering. Thus, the data representing each frame must be buffered until all the frame data is read. It can then be reordered and sent ot a decoder in the forward order. Because a video playback circuit will probably read new data as the current reversed frame is being sent to a decoder, two frame buffers, each of which is large enough to store the largest expected frame, are used in accordance with the present invention in a ping-pong manner for reverse operation with data being stored in one buffer while data is being read out of the other buffer.

While it is possible for a video playback circuit 210, e.g, the bitstream corrector circuit 220, to detect PCRs, PTSs and DTSs by scanning the bitstream read back from a tape, it is easier for the bitstream corrector circuit 220 if trick play packets carrying PCRs, PTSs or DTSs are identified by e.g., marked at recording time.

Accordingly, in one embodiment of the present invention, trick play data packets including PCRs, PTSs or DTSs are marked by the bitstream corrector circuit 109 prior to recording by adding an extra sync block header to identify trick play sync, e.g., data, blocks or they are marked by adding to an extra packet header, which is associated with a transport packet, information that indicates that the packet includes a PCR, PTS or DTS, prior to recording the trick play data packets on the tape. In the later case, the added packet header specifically identifies the transport packet associated therewith and including a PCR, PTS and/or DTS.

For fast reverse playback, reversal buffer control can be simplified if trick play frames (including all headers) are made to fit into trick play data locations on the tape such that a frame spans an integer number of head rotations. For example, if there were 25 trick play blocks read per head rotation, e.g., a 1800 rotation of the heads 214, a frame and associated headers would be composed of a multiple of 25 sync blocks.

The bitstream corrector circuit 220 can compute the encoded trick p)lay speed or rate, by examining the PCR values in the trick play data stream read from the tape and by measuring the number of bytes in the trick play data stream over a period between two PCR signals $PCR_i$ and $PCR_{i-1}$. The output data rate can then be computed as:

$DR_{calc}$=measured number of bytes×27 $MHz/(PCR_i$-$PCR_{i-1})$

The ratio between the current playback speed and the encoded playback speed is the ratio between the computed or intended output data rate which can be calculated as set forth above, and the known actual or measured output data rate for the trick playback speed being implemented. That is:

$N=DR_{current}/DR_{calc}$

The value 1/N is the scaling factor used for adjusting the PCRs, PTSs and DTSs in various embodiments of the present invention.

While it is possible to calculate the data rate at which recorded data was intended to be played back at 1, since the recording circuit 100 knows the rate for which it is encoding trick play data, it can, and in one embodiment does, store this information on the tape as auxiliary data on the tape when recording trick play data. This recorded data rate information is then read back and used by the bitstream corrector circuit 220 during trick playback operation.

What is claimed is:

1. A method of recording MPEG transport packets on a storage medium, one or more of the MPEG transport packets including PCR, PTS or DTS values, the method comprising the steps of:

generating a series of identification bits that identify the MPEG transport packets that include PCR, PTS or DTS values; and recording both the identification bits and the MPEG transport packets on the storage medium, the identification bits being separate from the MPEG transport data packets.

2. The method of claim 1, further comprising the step of:

arranging the MPEG transport packets into a trick play data block; and including the identification bits in a trick play data block header associated with the trick play data block.

3. The method of claim 2, wherein the trick play data block header identifies an MPEG transport packet, induced in the trick play data block, which includes a PCR, PTS or DTS value.

4. A method of processing a data stream including a plurality of MPEG transport packets, at least one transport packet including an adaptation header, the method comprising the steps of:

identifying an MPEG transport packet which includes a PCR, PTS or DTS value;

generating an additional header, that is distinct from said MPEG transport packet and any headers included in the MPEG transport packet, the additional header indicating that the identified MPEG transport packet includes a PCR, PTS or DTS value; and incorporating the generated header into the data stream.

5. The method of claim 4, further comprising the step of:

arranging a subset of the plurality of MPEG transport packets, including the identified MPEG transport packet, into a data block.

6. The method of claim 5, further comprising the step of:

recording the data block on a data storage device.

7. A method of processing a data stream including MPEG transport packets including headers, the method comprising the steps of:

generating at least one bit that identifies an MPEG transport packet that includes a PTS value, the at least one bit being in addition to the headers included in said MPEG transport packet; and recording the at least one bit and the MPEG transport packets including said headers using a recording device.

8. The method of claim 7, wherein the at least one bit is a bit of an extra header, and wherein the recording step includes the step of recording the extra header in addition to the transport packets including said headers.

9. A method of processing data that includes MPEG transport packets, each MPEG transport packet including headers, the method comprising the steps of:

generating a series of identification bits that identify at least one of said MPEG transport packets that includes a PTS value, the identification bits being different from the headers included in each MPEG transport packet included in the processed data; and storing the identification bits and said MPEG transport packets using a digital storage device.

10. The method of claim 9, wherein processed MPEG transport packet includes an adaptation header.

11. The method of claim 9, wherein the storing step includes the steps of:

recording the identification bits and said MPEG transport packets on a tape in locations from which data can be read during preselected modes of video player trick play operation.

12. The method of claim 9, wherein said series of identification bits form a packet header that is separate from said adaptation header included in the processed MPEG transport packets.

* * * * *